UNITED STATES PATENT OFFICE.

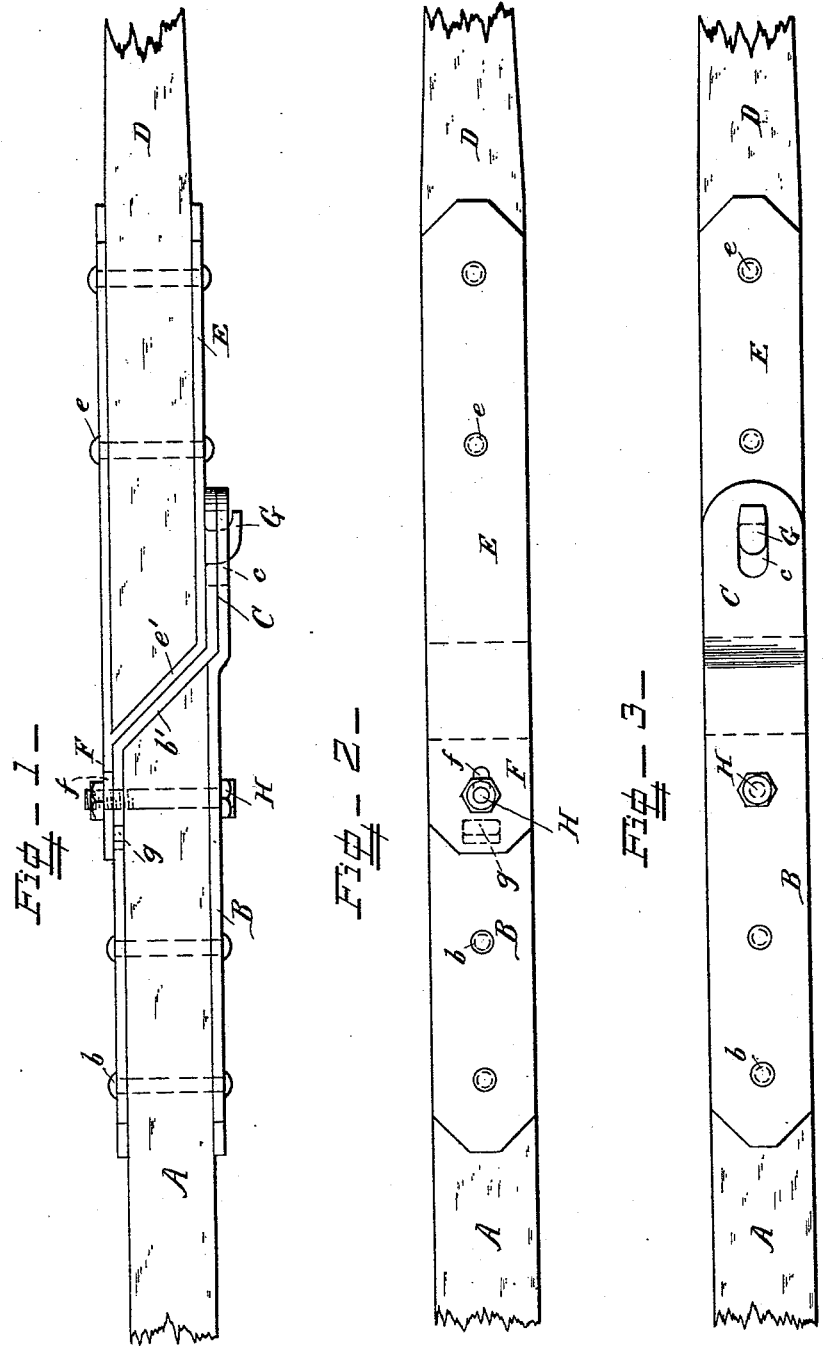

JACOB HOCKMAN, OF WAYNESBOROUGH, PENNSYLVANIA.

VEHICLE-POLE.

SPECIFICATION forming part of Letters Patent No. 426,500, dated April 29, 1890.

Application filed February 5, 1890. Serial No. 339,318. (No model.)

*To all whom it may concern:*

Be it known that I, JACOB HOCKMAN, a citizen of the United States, residing at Waynesborough, in the county of Franklin and State of Pennsylvania, have invented certain new and useful Improvements in Vehicle-Poles; and I do hereby declare the following to be a full, clear, and exact description of the invention, such as will enable others skilled in the art to which it appertains to make and use the same.

This invention relates to poles for vehicles; and it consists in the novel construction and combination of the parts hereinafter fully described and claimed.

In the drawings, Figure 1 is a side view of portions of a pole and its extension-piece constructed according to this invention. Fig. 2 is a plan view of the same from above. Fig. 3 is a plan view of the same from below.

Prior to my invention it has been the practice of makers of heavy vehicles—such as separators, heavy wagons, and portable engines—to provide two poles for each vehicle. The short pole was used for ordinary purposes, and when the vehicle stuck in a mud-hole or was otherwise rendered incapable of being moved by the short pole the said short pole was uncoupled and the longer pole substituted for it. According to the present invention the short pole does not require to be uncoupled from the vehicle. The short pole is provided with a socket at its front end adapted to be coupled to any tractive power, whether animal or steam-engine, and an extension-piece is provided and furnished with a socket at its rear end, which socket is adapted to be coupled to the aforesaid socket on the front end of the short pole.

A is the short pole, adapted to be attached to a vehicle in any approved manner.

B is a socket secured to the front end of pole A by bolts or rivets *b*. The socket B is provided with the inclined end *b'* and the projecting tongue C at the bottom of said inclined end. The tongue C is provided with the hole *c*, which is preferably elongated in line with the pole, and this tongue and hole form the draft attachment for connecting the short pole to a traction-engine or to the harness of horses.

D is the extension-piece adapted to be coupled onto the end of the short pole.

E is a socket secured to the rear end of the extension-piece D by the bolts or rivets *e*. The socket E is provided with the inclined end *e'* and the projecting tongue F at the top of said inclined end. The tongue F is provided with the hole *f*, which is also preferably elongated in line with the pole. The socket E is adapted to abut against the socket B, as shown in the drawings, and to be securely clamped to it.

In order that the sockets may be securely clamped together, and at the same time be quickly coupled and uncoupled, a hook G projects from the under side of the socket E and engages with the hole *c*, and the tongue F is provided with a projection *g*, which drops into a corresponding hole in the top of socket B.

H is a bolt which passes through the socket B and through the hole *f* in tongue F and secures the two sockets firmly together. The sockets are so proportioned that when the bolt H is tightened up the two inclined ends *b'* and *e'* are drawn together, and all the rearward pushing strain is transmitted through them. At the same time the projection *g* and hook G bear against the ends of the holes with which they engage, so that the forward pulling strain is transmitted through them. The clamping-bolt is thereby relieved from both pushing and pulling strains.

The socket B is shown as made of two metal plates, which are preferably of wrought-iron, and the socket E is shown as made in one piece, preferably of cast malleable iron; but I do not confine myself to sockets made in this manner, as either socket or both may be of wrought or cast malleable iron or of other similar material.

I do not confine myself to the particular devices described for clamping the two sockets together, although I prefer to use them, as bolts, hooks, catches, and clamps of various kinds may be arranged for detachably connecting these parts.

I am aware that it is not new to form a vehicle-shaft of two parts, and that the same have been coupled by hinges, thimbles, and various forms of joint.

What I claim is—

1. The combination, with a vehicle-pole provided with a socket having a permanent draft attachment—such as a perforated projecting tongue—at its front end, of an extension-piece provided with a reversely similar socket at its rear end and adapted to engage with the aforesaid socket, substantially as and for the purpose set forth.

2. The combination, with a vehicle-pole provided with a socket having a permanent draft attachment—such as a perforated projecting tongue—at its front end, of an extension-piece provided with a socket at its rear end and coupling devices for connecting the two said sockets together, substantially as and for the purpose set forth.

3. The combination, with a short vehicle-pole provided with a permanent draft attachment—such as a perforated projecting tongue—at its front end, of an extension-piece and coupling devices adapted to connect the extension-piece to the said draft attachment, so that they may be quickly and repeatedly coupled and uncoupled, substantially as and for the purposes set forth.

4. The combination, with a vehicle-pole and a socket secured to the end of said pole and provided with an inclined end and a projecting tongue forming its draft attachment, of an extension-piece, a socket secured to the rear end of said piece and provided with an inclined end and a projecting tongue, and coupling devices for detachably connecting the two said sockets, substantially as and for the purpose set forth.

5. The combination, with a vehicle-pole and a socket secured to the end of said pole and provided with an inclined end and a projecting tongue, of an extension-piece, a socket secured to the rear end of the extension-piece and provided with an inclined end, a projecting tongue and a projecting portion—such as a hook—adapted to engage with a hole in the pole-socket, and a single removable bolt for coupling the two said sockets together, substantially as and for the purpose set forth.

6. The combination, with a vehicle-pole and a socket secured to the end of said pole and provided with an inclined end and a projecting tongue, of an extension-piece, a socket secured to the rear end of the extension-piece and provided with an inclined end, a projecting tongue, and a hook and a projection adapted to engage with holes in the upper and lower parts of the said pole-socket, and a single removable bolt passing through the pole-socket and the tongue of the extension-piece socket, substantially as and for the purpose set forth.

In testimony whereof I affix my signature in presence of two witnesses.

JACOB HOCKMAN.

Witnesses:
   HERBERT W. T. JENNER,
   PHILIP MAURO.